United States Patent
Likar et al.

(10) Patent No.: US 8,260,357 B2
(45) Date of Patent: Sep. 4, 2012

(54) METHOD FOR 4G NODE FREQUENCY SELECTION

(76) Inventors: Bojan Likar, Ig (SI); Robert Posel, Ljubljana (SI); Andreas Kalagasidis, Ljubljana (SI); Janez Bester, Zg.Besnica (SI); Andrej Kos, Blejska Dobrava (SI); Mojca Volk, Bled (SI); Urban Sedlar, Bohinjska Bistrica (SI); Luka Mali, Novo mesto (SI); Janez Sterle, Ljubljana (SI)

( * ) Notice: Subject to any disclaimer, the term of this patent is extended or adjusted under 35 U.S.C. 154(b) by 182 days.

(21) Appl. No.: 12/882,890

(22) Filed: Sep. 15, 2010

(65) Prior Publication Data

US 2012/0064832 A1    Mar. 15, 2012

(51) Int. Cl.
 *H04M 1/00* (2006.01)
 *H04B 1/38* (2006.01)
(52) U.S. Cl. ........ 455/561; 455/418; 455/420; 455/423; 455/424; 455/446; 455/447; 455/450; 455/452.1; 455/452.2; 455/62; 455/63.1; 455/67.11; 455/67.13; 455/67.7; 455/562.1; 455/507; 455/509; 370/329; 370/341
(58) Field of Classification Search .......... 455/418–420, 455/423–425, 452.1, 452.2, 450, 451, 63.1, 455/67.11, 67.13, 67.15, 67.16, 67.7, 68, 455/561, 562.1, 446, 447, 62, 507, 509; 370/329–330, 341–343, 252
See application file for complete search history.

(56) References Cited

U.S. PATENT DOCUMENTS

| | | | |
|---|---|---|---|
| 5,212,831 A | 5/1993 | Chuang et al. | |
| 5,737,705 A | 4/1998 | Ruppel et al. | |
| 6,253,086 B1 | 6/2001 | Parantainen et al. | |
| 2010/0111013 A1* | 5/2010 | Chou | 370/329 |
| 2010/0208707 A1* | 8/2010 | Hamabe et al. | 370/332 |
| 2010/0216486 A1* | 8/2010 | Kwon et al. | 455/452.2 |
| 2010/0254344 A1* | 10/2010 | Wei et al. | 370/330 |
| 2010/0272218 A1* | 10/2010 | Yeh et al. | 375/330 |
| 2010/0311415 A1* | 12/2010 | Hamabe et al. | 455/425 |
| 2011/0002284 A1* | 1/2011 | Talwar et al. | 370/329 |
| 2011/0028144 A1* | 2/2011 | Catovic et al. | 455/423 |
| 2011/0045835 A1* | 2/2011 | Chou et al. | 455/446 |
| 2011/0151881 A1* | 6/2011 | Chou et al. | 455/447 |
| 2011/0190016 A1* | 8/2011 | Hamabe et al. | 455/507 |

\* cited by examiner

*Primary Examiner* — Tuan A Tran
(74) *Attorney, Agent, or Firm* — Pillsbury Winthrop Shaw Pittman LLP

(57) ABSTRACT

A method for 4G node frequency selection describes a mechanism for automatically selecting the frequency of a newly installed base station, thereby optimizing the throughput per area unit of the newly installed base station in its predefined vicinity area. The method is based on an iterative calculation approach which combines real-world network and base station measurements information with the nominal specifications of the newly installed base station (antenna diagram, output power) and the location and direction thereof.

5 Claims, 9 Drawing Sheets

METHOD FOR 4G NODE FREQUENCY SELECTION

FIELD OF THE INVENTION

The present invention refers to a method for 4G node frequency selection.

BACKGROUND OF THE INVENTION

Wireless networks are first and foremost constrained by the limited resources of wireless spectrum. Different techniques are employed to allow coexistence of different wireless networks and simultaneous use of resources by multiple mobile terminals. Among such techniques, Time Division Multiple Access divides the use of a single wireless frequency into time slices; Frequency Division Multiple Access bases on using multiple non-overlapping frequency bands at the same time; with Code Division Multiple Access mobile stations use a wide frequency band simultaneously and separate the communication channels by using different pseudo codes.

Increased bandwidth demands and quality-of-service (QoS) requirements of the end-users present a challenge for the wireless network operators, which can be resolved only by increasing the base station density, limiting their range and thus allowing better and denser frequency reuse.

With increased base station density, the maintenance costs become prohibitive and such dense network maintenance and operation must become highly automated in order for the network to remain economically viable. The present invention relates to such automated base station frequency assignment with the aim of optimizing the throughput of the network per unit of area.

Different solutions relating to automated base station frequency selection exist. U.S. Pat. No. 6,253,086 B1 proposes adaptive frequency selection based on spectrum scans and the identification of a frequency that has the smallest transmission power or Received Signal Strength Indication (RSSI) at the location of the measuring base station. A similar approach is described in U.S. Pat. No. 5,212,831.

An important drawback of the presented methods is the problem of a hidden base station, where two base stations do not see each other and thus determine through signal strength measurements that a frequency is available and as such both choose the same frequency. At the location, from which both base stations are visible, the signals from both base stations can cause significant interference. U.S. Pat. No. 6,253,086 addresses the problem of the hidden base station by adaptive network planning using probes or mobile stations for signal strength (RSSI) measurements. U.S. Pat. No. 5,737,705 introduces an approach to solving additional problems, such as multiple base stations performing passive measurements simultaneously, possibly resulting in a multitude of stations selecting the same frequency at the same time.

All referenced inventions rely on RSSI measurements, either at the location of the base station or at the distributed locations using mobile stations. An important drawback of the described methods is the disregard of the estimated throughput provided by a base station and the surface area size, served by the said base station. A single base station, serving a surface area of one unit with sufficiently high RSSI to provide 100% relative throughput has ten times the throughput per surface area as a different base station which serves ten units of surface area with the same RSSI, providing 100% throughput. The former base station can thus serve respectively larger number of users or serve the same number of users with respectively larger throughputs.

In the preferred embodiment, this invention describes a method for automated frequency assignment on the basis of throughput per unit of area, hereafter referred to as AreaT. The method is based on an iterative simulation approach, wherein the centralized self-organizing network server performs calculations using the real-world measurements information about existing network and its base stations, combined with the nominal specifications (antenna diagram, output power), location and the direction of the newly installed base station.

DETAILED DESCRIPTION OF THE INVENTION

Figure 1:
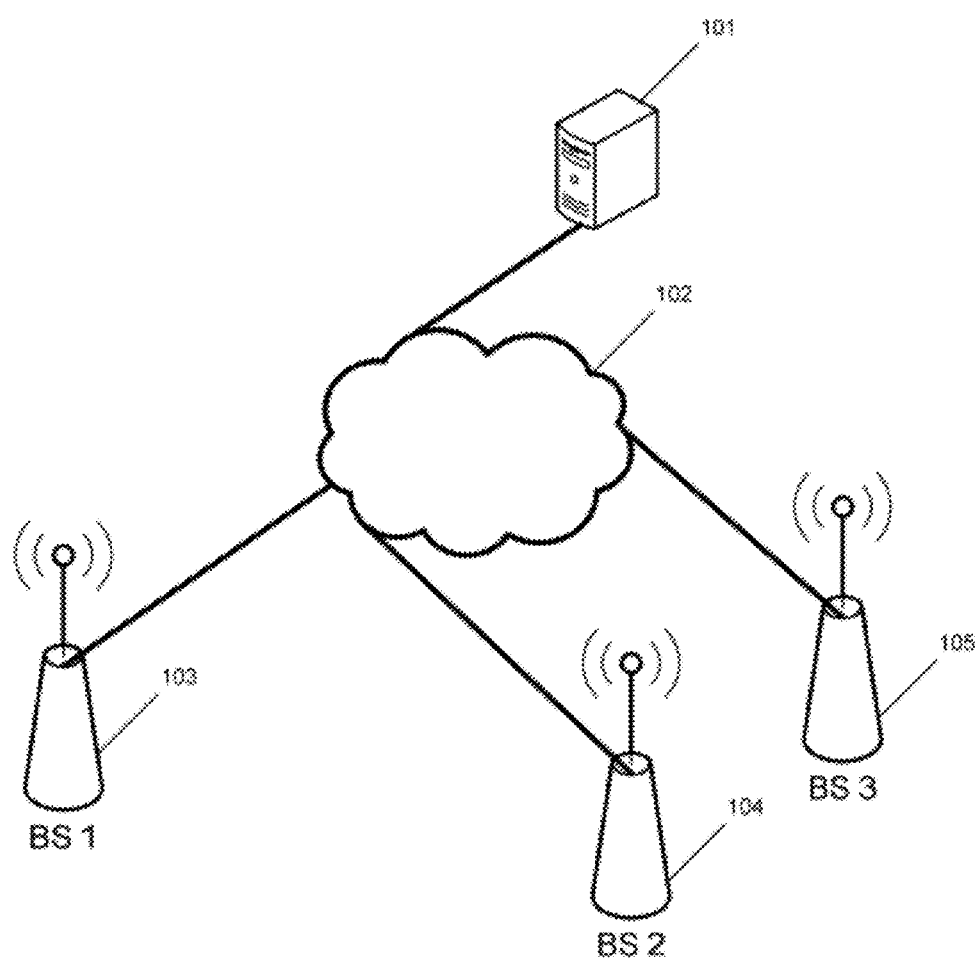
FIG. 1 shows a generalized 4G mobile network.
Figure 2:
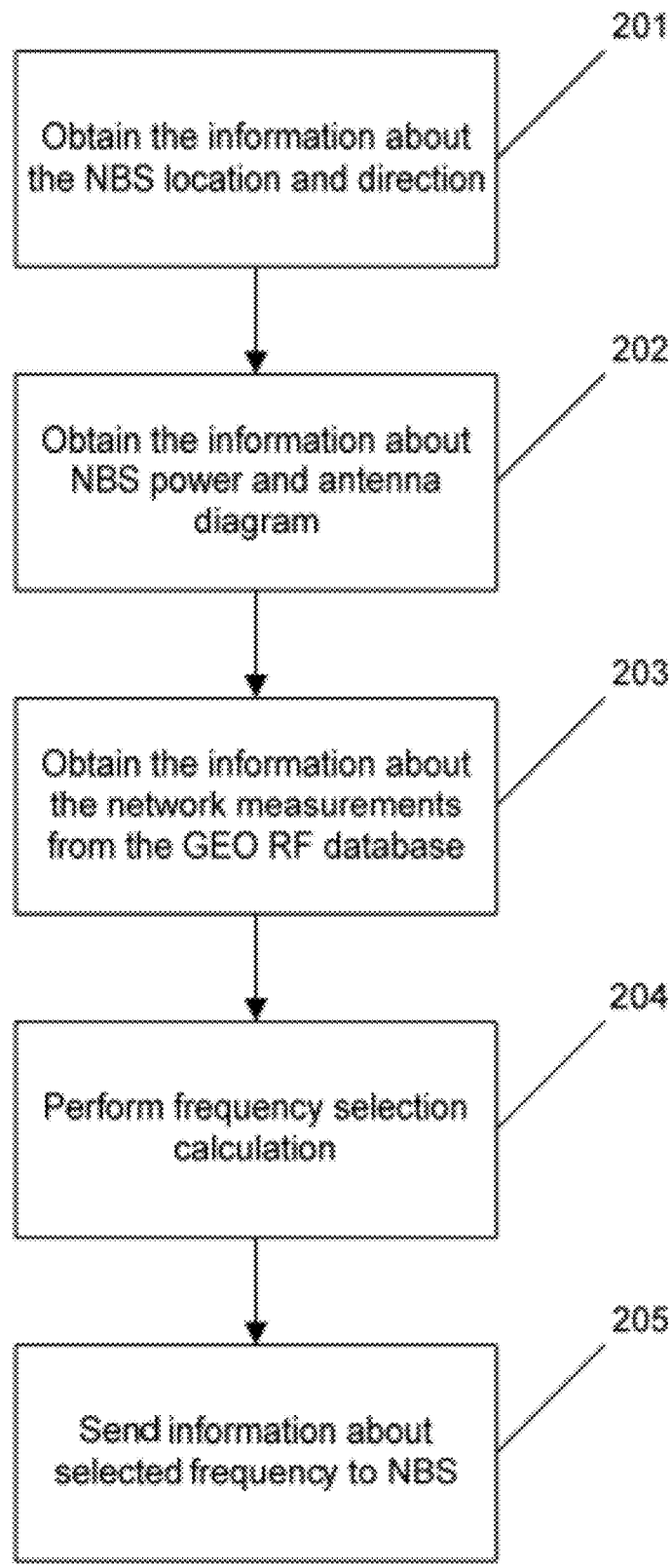
FIG. 2 shows a flow chart of the process of 4G node frequency selection, taking place in the SON server.
Figure 3:
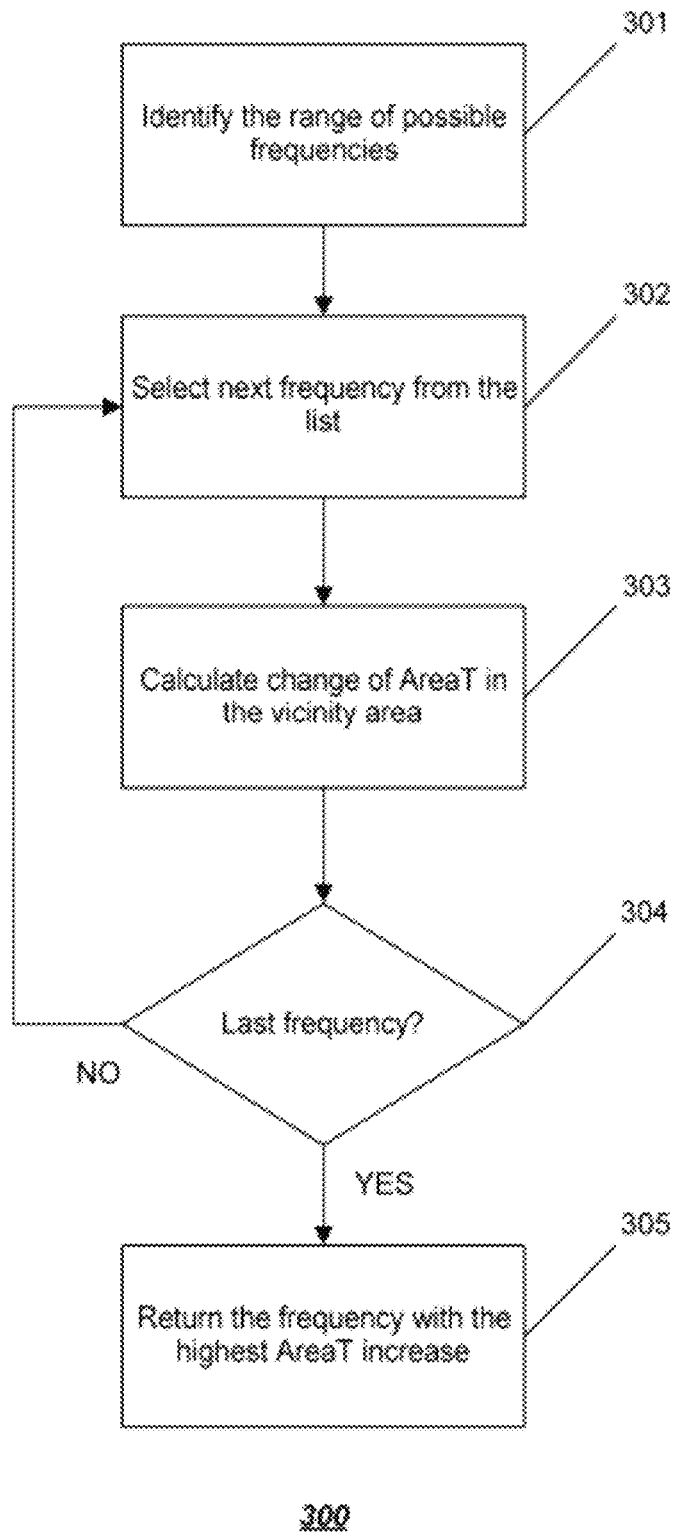
FIG. 3 shows a flow chart of the process of selecting the frequency, which yields the highest throughput per unit of area (AreaT)
Figure 4:
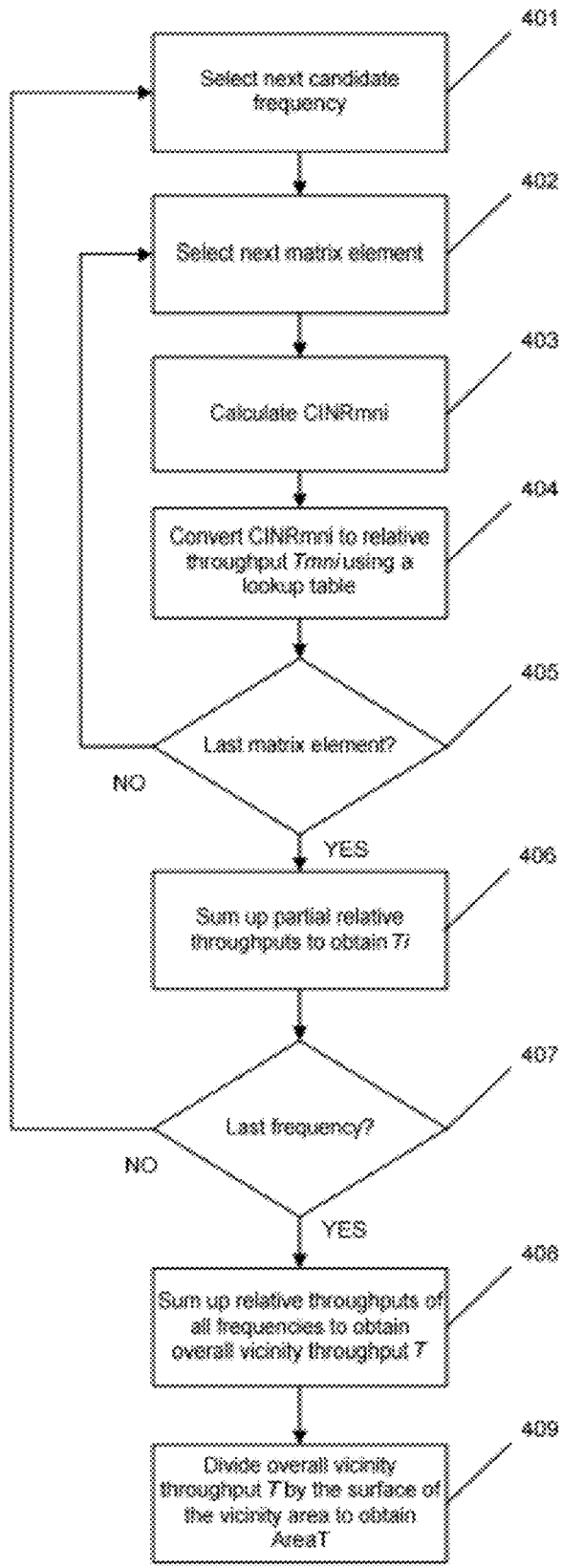
FIG. 4 shows a flow chart of the AreaT calculation process.
Figure 5:
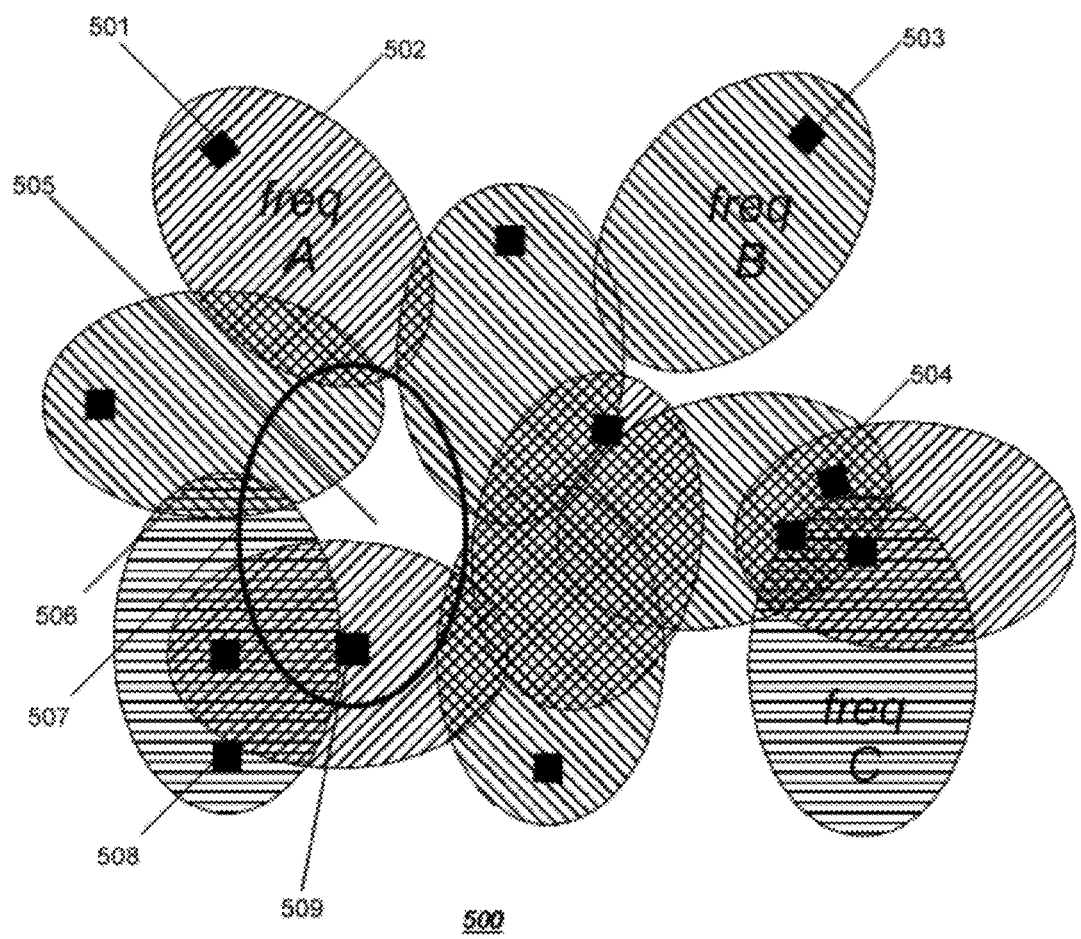
FIG. 5 shows a coverage map of the wireless network using three different frequencies (A, B, C)
Figure 6:
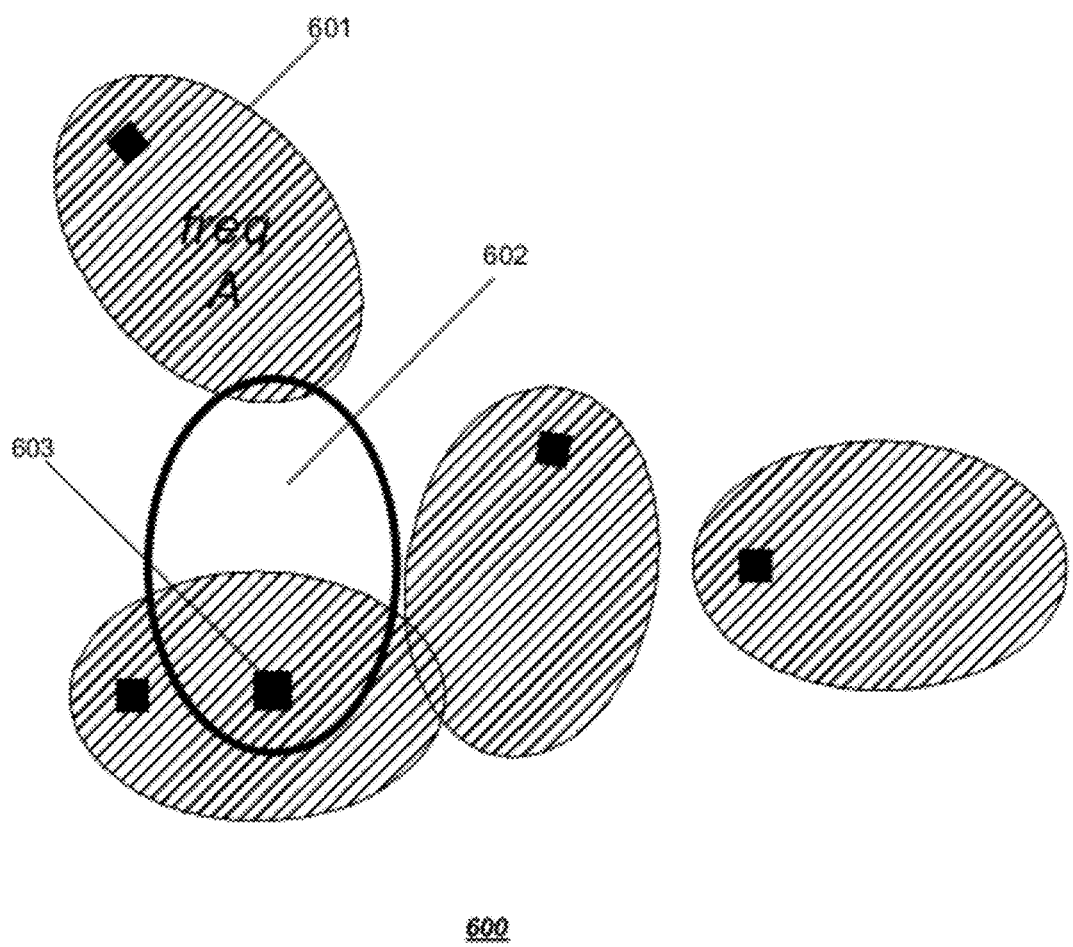
FIG. 6 shows a subset of the wireless network coverage map (FIG. 5), showing only the coverage of a single frequency (A), together with a placement of an additional base station and its expected coverage area (thick line)
Figure 7:
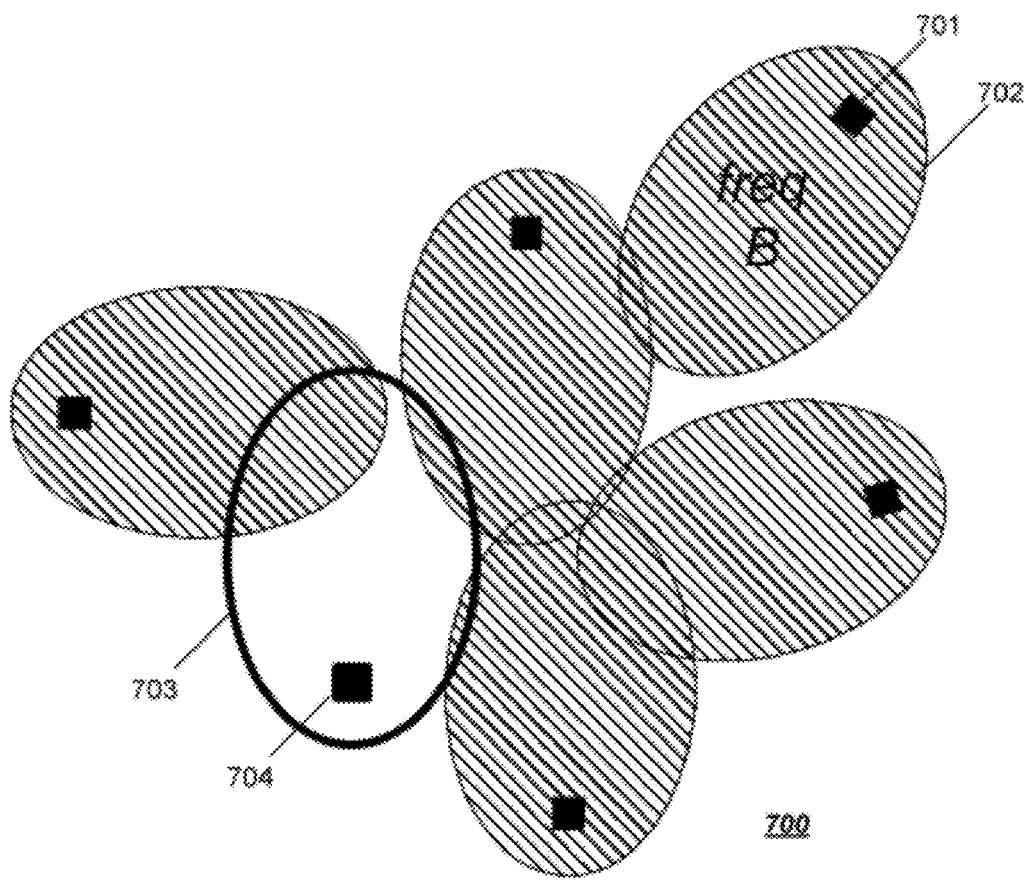
FIG. 7 shows a subset of the wireless network coverage map (FIG. 5), showing only the coverage of a single frequency (B), together with a placement of an additional base station and its expected coverage area (thick line)
Figure 8:
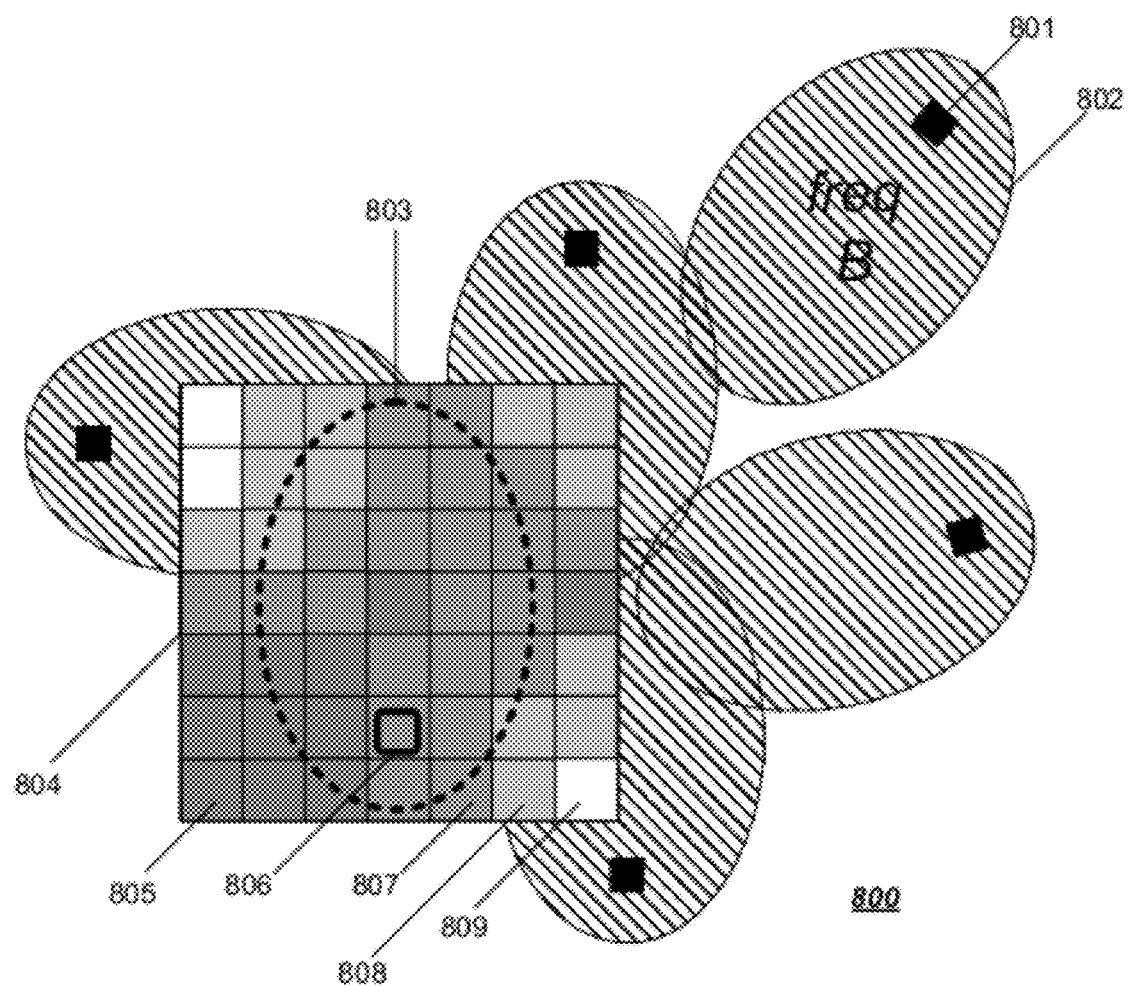
FIG. 8 shows a vicinity matrix of dimensions M by N overlaid over the wireless network coverage map at frequency B at the location of the new base station (NBS), where said matrix shows the signal strengths (RSSI) using different shades of gray, and where said NBS, with its expected coverage area identified by a dotted line, is not yet activated.

As mentioned above, FIG. 1 shows a generalized 4G mobile network, consisting of a plurality of base stations (BS) (103,104,105), a network interconnecting the base stations (102) and a Self-organizing Network (SON) server (101). A wireless system (100) comprises the self-organizing network (SON) server (101) and a self-organizing network (SON) agent, located in a base station (BS) (103, 104 and 105).

When an uncovered area (505) in the network coverage map or an area with insufficient throughput per user is identified, the network operator aims to install an additional base station to cover the identified area and to provide higher throughput. The wireless network operator chooses from a list of suitable locations and provides the location (longitude, latitude) and direction (phi) of the antenna to be installed, based on the geographical and urban characteristics of the region to be covered. Additionally, the network operator provides the antenna diagram, a set of possible operating frequencies and sector output power (P) information of the said base station. Such newly added base station (NBS) (509) is installed and its expected coverage area (507) is mapped onto the wireless network coverage map (500).

The aim of the method is to select an optimum NBS operating frequency, which maximizes the local throughput per area (AreaT) in the predefined vicinity of the NBS. The frequency selection procedure takes place in the SON server (101).

SON server obtains geographic location (longitude, latitude), antenna direction (phi) (201) and BS output power information (202) either directly from the NBS by querying it, or from the local database, where it is stored from a previous NBS query. Additionally, SON server also acquires the antenna diagram (202) of the NBS and information about network coverage measurements from the local database. The information about neighboring base stations and their coverage matrices is obtained from the local geographical radio frequency (GEO RF) database (203) in the form of RSSI for the area surrounding the predefined vicinity of the NBS. The vicinity area (804) of the NBS is a rectangular area surrounding NBS, represented as an M by N matrix. The SON server obtains RSSI information of all base stations that transmit at each individual element of the M by N matrix.

Next, SON server calculates (204) the effects of using different frequencies on the overall AreaT in the predefined vicinity (804) and selects the frequency, which yields the highest local AreaT increase in the predefined vicinity of the NBS.

It is evident from the coverage map (500) that the existing base stations operate at different frequencies (e.g., base station 501 at frequency A, base station 503 at frequency B, base station 508 at frequency C).

The whole range of frequencies granted to the wireless operator is iterated through (300). At each frequency $f_i$ the coverage map becomes a subset of the cumulative coverage map (500), e.g., coverage map (600) at frequency A, coverage map (700) at frequency B, etc.

For each available frequency $f_i$, the effect of the NBS is calculated. This is performed by estimating the improvements in relative throughput over all available frequencies in the vicinity area of the NBS, taking into account the reduced throughput of the existing base stations due to the decreased Carrier to Interference plus Noise Ratio (CINR), which is a direct result of increased interference at the frequency $f_B$, where the NBS operates.

As a first step, the information about antenna diagram of the NBS and the transmitting power thereof are converted into matrix form. The antenna diagram is usually represented in polar (angle-of-direction-dependent) coordinate system. The transmission power and path-loss propagation models for the respective environment are taken into account. Final resulting matrix of dimensions M by N is suitable for the frequency selection calculation.

For each rectangular sub-area (805), represented by an element in the M by N matrix, the relative throughput is calculated, defined as follows.

First, the CINR for element at position [m,n] and at frequency $f_i$ is calculated (403), denoted as $CINR_{mni}$. The maximum RSSI at the given rectangular sub-area belongs to the serving base station ($RSSI_{serving}$), which is often nearest to the said rectangular sub-area. At the same rectangular sub-area, the signal of other neighboring base stations may be present ($RSSI_{other}$), which causes interference.

Figure 9:
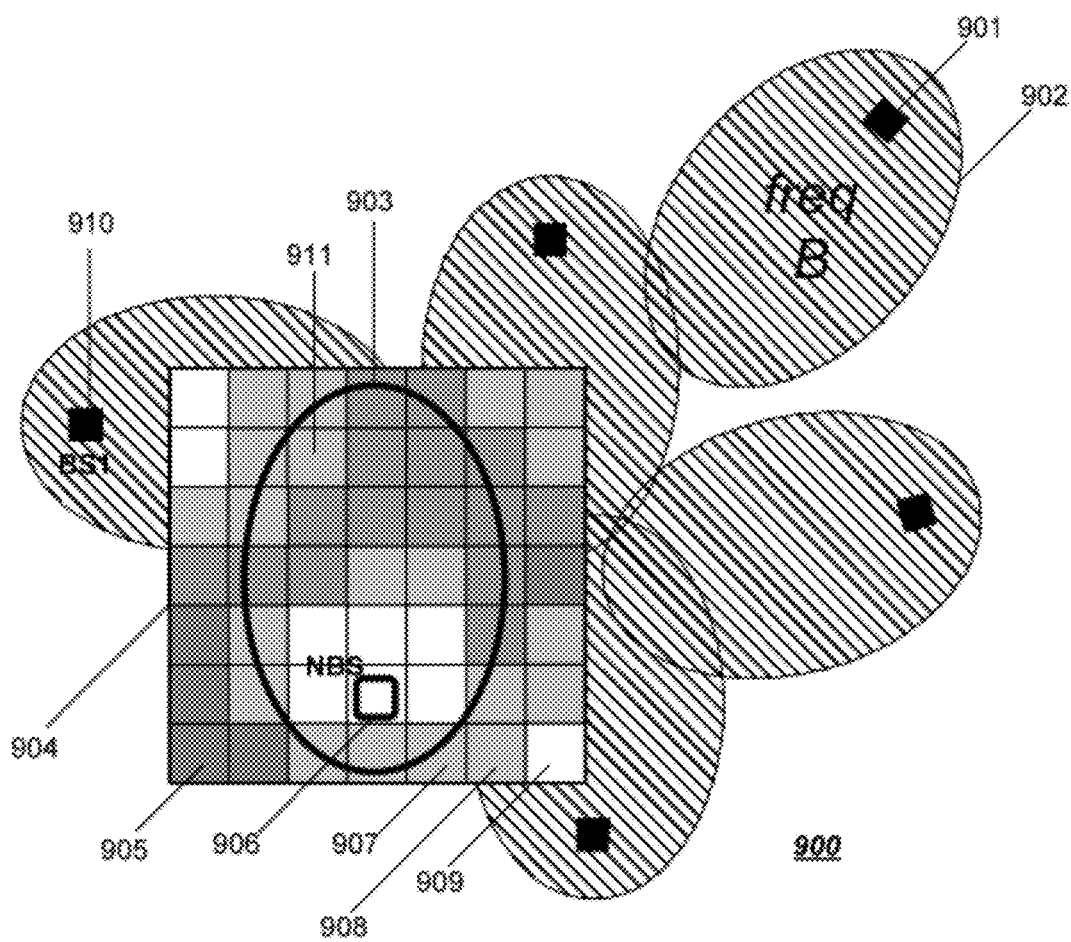
FIG. 9 shows a vicinity matrix of dimensions M by N overlaid over the wireless network coverage map at frequency B at the location of the new base station (NBS), where said matrix shows the signal strengths (RSSI) using different shades of gray, and where said NBS, with its expected coverage area identified by a dotted line, is activated and RSSI levels have changed compared to FIG. 8.

In FIG. 9, (911) denotes a rectangular sub-area with two RSSI contributions—one of BS1 (910) and another of NBS (906). The maximum RSSI in the presented example belongs to the nearest BS1 (910). Consequently, the RSSI of the NBS is regarded as interference and falls under $RSSI_{other}$; thus $CINR_{mni}$ equals the $RSSI_{serving}$ in the area [m,n], divided by the sum all $RSSI_{other}$ strengths and noise combined.

Using a lookup table from the base station manufacturer, $CINR_{mni}$ is converted (404) into partial relative throughput, e.g., $T_{mni}$=100%.

The relative throughput $T_i$ of the whole rectangular vicinity area for frequency $f_i$ is calculated (406) as the sum of partial throughputs $T_{mni}$, divided by the number of elements in the matrix (M times N).

The described calculation is repeated (401) for every other frequency f available to the operator. Since the currently simulated NBS transmits at a single frequency $f_B$, the relative throughputs at all other frequencies $\{T_1, T_2, \ldots, T_i, \ldots, T_N, i \square B\}$ exhibit no change.

The cumulative throughput T (408) in the vicinity area (804) of the NBS thus equals the sum of all $T_i$, divided by the number of all available frequencies. Thus the T represents the throughput, which can be achieved by using all available frequencies simultaneously (which in reality is usually the case, since the mobile stations can switch between available frequencies and choose any one of them). To calculate the AreaT, the combined throughput T of all available frequencies is divided (409) by the size of the rectangular sub-area (805) of the NBS vicinity matrix area (804). The latter serves as the scope of the said optimization method.

As is evident from the matrix (804) before the NBS is assumed operational (800), certain elements (809) in the vicinity of the neighboring base stations exhibit high relative throughput, while others exhibit low (805) relative throughput at frequency B (802). By assuming the NBS (906) is in operational mode (900) using frequency B (902), the values of relative throughput change (904) and the AreaT increases.

Relative improvement in cumulative AreaT is calculated for each available frequency and the frequency which exhibits the highest relative AreaT improvement is selected as optimal for NBS in the given environment.

When the SON server identifies the optimal frequency of the NBS, the frequency settings are sent to the SON agent of the NBS and the base station is set into the operational mode.

With a large number of available frequencies, the iterative procedure may prove to be very computationally intensive. Thus, a limited number of candidate frequencies (e.g., three) are isolated on the basis of maximum area coverage per frequency. Only the selected candidate frequencies are used for further comparisons, thus limiting the processing power needed for optimum frequency estimation procedure.

The invention claimed is:

1. A method for 4G node frequency selection, comprising the following steps
   a. Self-organizing Network (SON) server obtaining the location and direction information of the newly added base station (NBS),
   b. SON server obtaining the antenna diagram of the NBS,
   c. SON server obtaining the information about the network measurements from the local geographical radio frequency (GEO RF) database,
   d. SON server performing the frequency selection calculation,
   e. SON server sending the frequency settings command to the NBS.

2. A method of claim 1, where obtaining the antenna diagram of the NBS consists of conversion of antenna diagram from polar (angle-of-direction-dependent) coordinate system into matrix form suitable for the frequency selection calculation. In the process the information about the transmitting power of a base station and a suitable path-loss model are utilized to obtain the matrix form.

3. A method of claim 1, where SON server performing the frequency selection calculation comprises the following steps:
   a. identifying the range $\{f_1, f_2, \ldots, f_i, \ldots f_N\}$ of possible frequencies which serves as a basis for frequency selection,
   b. iterating through the list of possible frequencies and creating subset coverage maps,
   c. calculating the effect of the NBS for each of the possible frequencies on local throughput per area (Area T),
   d. selecting the frequency which provides the largest increase in AreaT.

4. A method of claim 3, where identifying the range of possible frequencies which serves as a basis for frequency selection consists of the following steps:
   a. obtaining a list of possible frequencies from the operator,
   b. selecting a limited number of candidate frequencies (e.g., three) on the basis of maximum white space coverage per frequency to decrease the complexity and increase the speed of the calculation.

5. A method of claim 3, where calculating the effect of the NBS for each of the possible frequencies on AreaT comprises the following steps:
   a. calculating the $CINR_{mn}$ for each element in the vicinity matrix,
   b. using a lookup table to convert the $CINR_{mn}$ into partial relative throughput $T_{mni}$,
   c. sum up the partial relative throughputs $T_{mni}$ and divide them by the number of elements in the matrix (m times n) to obtain the relative throughput of the entire vicinity area $T_i$,
   d. sum up the relative throughputs $T_i$ of all possible frequencies and divide the sum by the total number of frequencies to obtain the overall relative throughput T of the vicinity area,
   e. divide the overall relative throughput T by the size of the vicinity area to obtain the AreaT,
   f. identify the frequency which yields the highest AreaT increase within the vicinity area.

* * * * *